(12) United States Patent
Graffouliere

(10) Patent No.: US 8,358,683 B2
(45) Date of Patent: Jan. 22, 2013

(54) CHANNEL EQUALIZER

(75) Inventor: Philippe Graffouliere, Grenoble (FR)

(73) Assignee: STMicroelectronics S.A., Grenoble (FR)

( * ) Notice: Subject to any disclaimer, the term of this patent is extended or adjusted under 35 U.S.C. 154(b) by 1038 days.

(21) Appl. No.: 12/058,897

(22) Filed: Mar. 31, 2008

(65) Prior Publication Data

US 2009/0245341 A1    Oct. 1, 2009

(51) Int. Cl.
  *H03H 7/30* (2006.01)
  *H03H 7/40* (2006.01)
  *H03K 5/159* (2006.01)

(52) U.S. Cl. .................. 375/232; 375/229; 375/230

(58) Field of Classification Search .................. 375/232
See application file for complete search history.

(56) References Cited

U.S. PATENT DOCUMENTS

| | | | | |
|---|---|---|---|---|
| 6,115,433 | A * | 9/2000 | de Lantremange | 375/326 |
| 6,141,378 | A * | 10/2000 | d'Oreye de Lantremange | 375/232 |
| 7,532,868 | B1 * | 5/2009 | Sapozhnykov et al. | 455/127.1 |
| 2005/0105651 | A1 * | 5/2005 | Jaffe et al. | 375/326 |
| 2005/0243908 | A1 * | 11/2005 | Heo et al. | 375/233 |

* cited by examiner

*Primary Examiner* — Erin File
(74) *Attorney, Agent, or Firm* — Wolf, Greenfield & Sacks, P.C.

(57) ABSTRACT

A channel equalizer arranged to receive a data signal encoded by a plurality of amplitude levels, the circuitry including a filter having a plurality of taps, each tap generating an output signal based on a coefficient, an input for receiving an error signal for adapting the coefficients, and an output for outputting a filtered signal; and blind error generation circuitry arranged to generate the error signal, the blind error generation circuitry including: error estimating circuitry arranged to estimate the error of the filtered signal based on maximum likelihood; and adding circuitry coupled to the error estimating circuitry and to the output of the filter and arranged to add at least part of the filtered signal to the error estimated by the error estimating circuitry to generate the error signal.

21 Claims, 3 Drawing Sheets

CHANNEL EQUALIZER

FIELD OF THE INVENTION

The present invention relates to a channel equalizer for use in multi-path environments, and in particular to a channel equalizer comprising a filter and blind error estimating circuitry for blindly estimating the error at the output of the filter.

BACKGROUND OF THE INVENTION

The transmission of a signal in a multi-path environment results in a plurality of delayed versions of the signal being received by receiving circuitry. Such multi-path environments are for example the result of obstacles in the path between the transmitter and the receiver, such as buildings, features of the landscape, etc.

Circuits for receiving signals in multi-path environments generally comprise a channel equalizer for summing all of the received signals and recovering the original signal. Such channel equalizers generally comprise a filter having many taps, often as many as several thousand. Each tap multiplies a delayed version of the input signal by a certain coefficient, and the outputs from all of the taps are added together to generate an output signal. The coefficients of the taps are generally calibrated for a particular environment at the start of a transmission, and may require recalibration at regular intervals, particularly in the case of dynamic transmission channels.

It is often difficult to calibrate the filter coefficients sufficiently quickly, particular at low signal to noise ratios. There is thus a need for an improved method and circuitry for determining the coefficients of the filter of a channel equalizer.

SUMMARY OF THE INVENTION

It is an aim of embodiments of the present invention to at least partly address one or more needs in the prior art.

According to one aspect of the present invention, there is provided a channel equalizer arranged to receive a data signal encoded by a plurality of amplitude levels, the circuitry comprising a filter comprising a plurality of taps, each tap generating an output signal based on a coefficient, an input for receiving an error signal for adapting said coefficients, and an output for outputting a filtered signal; and blind error generation circuitry arranged to generate said error signal, the blind error generation circuitry comprising: error estimating circuitry arranged to estimate the error of said filtered signal based on maximum likelihood; and adding circuitry coupled to said error estimating circuitry and to the output of said filter and arranged to add at least part of said filtered signal to the error estimated by said error estimating circuitry to generate said error signal.

According to an embodiment of the present invention, the channel equalizer is part of a vestigial sideband receiving system.

According to another embodiment of the present invention, the adding circuitry is coupled to the output of said filter via a variable gain amplifier, which is, for example, arranged to provide a gain such the portion of the filtered signal above a determined magnitude is maintained at a determined value.

According to another embodiment of the present invention, the error estimating circuitry is arranged to estimate the error of said filtered signal based on the following formula:

$$e(t)=(y-a_1)*p(s=a_1|y)+ \ldots +(y-a_N)*p(s=a_N|y)$$

where there are N amplitude levels, $a_1$ being a first level and $a_N$ being the final level, where y is the filtered signal, s is the original data, and $p(s=a_N|y)$ is the probability that s is equal to level $a_N$ given the filtered signal y.

According to another embodiment of the present invention, the filter is a feed-forward filter, and further comprising a decision feedback filter coupled to the output of said feed-forward filter.

According to another aspect of the present invention, there is provided a device for receiving a transmitted signal comprising a processor and receive circuitry comprising the above channel equalizer.

According to another aspect of the present invention, there is provided a method of performing channel equalization comprising: receiving a data signal encoded by a plurality of amplitude levels; filtering said data signal to provide a filtered signal using a plurality of taps, each tap generating an output signal based on a coefficient, said coefficients being updated based on an error signal; and blindly generating said error signal comprising: estimating the error of said filtered signal based on maximum likelihood; and adding at least part of said filtered signal to the error estimated by said error estimating circuitry to generate said error signal.

According to another embodiment of the present invention, the method comprises adjusting said coefficients of said taps based on a direct data mode when the signal to noise ratio of said filtered signal reaches a determined level.

According to another embodiment of the present invention, the adding step comprises adding an amplified version of said filtered signal to said error estimated by said error estimating circuitry, the gain of said amplified version being determined by the following formula:

$$gain=gain-k((N-1)*(|EQ\_OUT|>V)-1)$$

where k is a constant, N is the total number of levels, (|EQ_OUT|>V) is a Boolean equal to 1 when |EQ_OUT| is greater than V and 0 otherwise, and V is a constant magnitude, preferably equal to the magnitude of the highest level.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 1:
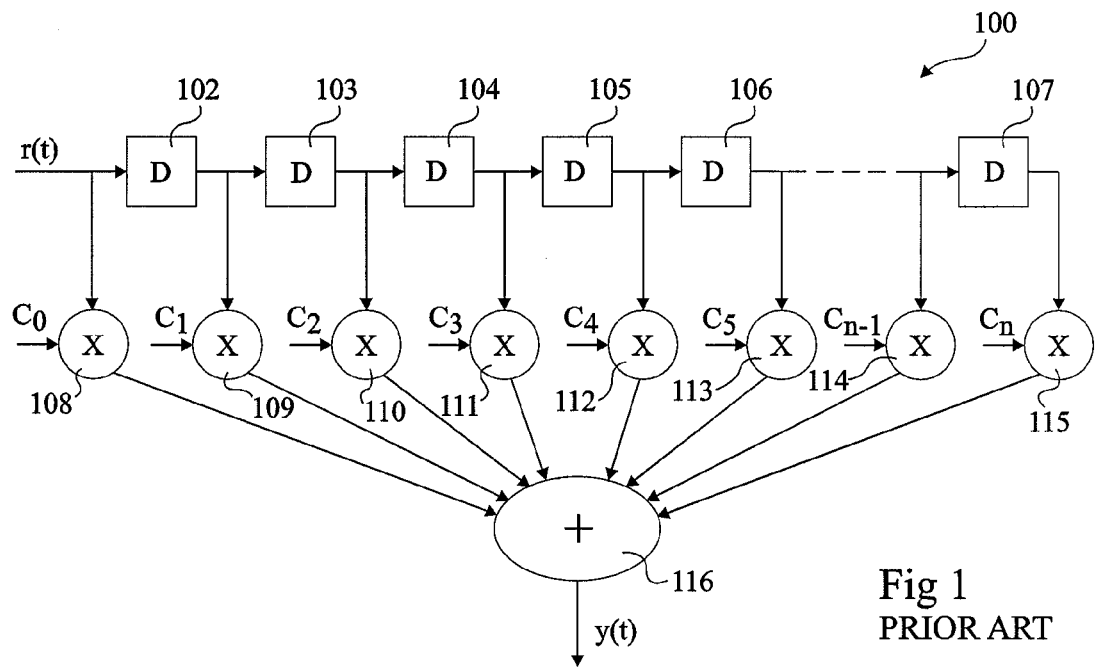
FIG. 1 illustrates a filter circuit of a channel equalizer.

FIG. 1 illustrates an example of the filter 100 of a channel equalizer for receiving a signal r(t) received from a multi-path environment. Filter 100 comprises an input for receiving signal r(t), which is for example received by an aerial, and a series of delay elements 102 to 107, which each delay signal r(t) by a determined amount. Signal r(t) is coupled to a first multiplier 108, which multiplies this signal by a coefficient $C_0$. The outputs of the delay elements 102 to 107 are coupled to respective multipliers 109 to 115, which multiply these signals by respective coefficients $C_1$ to $C_n$. The outputs of multipliers 108 to 115 are added together by an adder 116 to generate an equalized signal y(t).

In order to calibrate the coefficients of the filter, there are a number of techniques that are currently used. One method involves the use of training symbols, which are transmitted with the broadcast signal. However, a disadvantage with using training symbols is that they are generally transmitted infrequently, for example accounting for less than 1 percent of all symbols in the case of 8-VSB modulation, meaning that adapting the equalizer coefficients based on training symbols is slow.

As an alternative, Viterbi decisions can be used to determine the data at the output of the channel equalizer and adapt the values of the coefficients, however this method is only effective when the signal to noise ratio (SNR) at the output of the channel equalizer reaches a certain level, for example approximately 12 dB in the case of 8-VSB modulation, and therefore it can not be used during initial calibration of the coefficients.

Some blind techniques for determining the coefficients have been proposed, which can be used for initial calibration and without knowing the data in advance. One such technique will now be described in more detail with reference to FIGS. 2A and 2B.

Figure 2A:
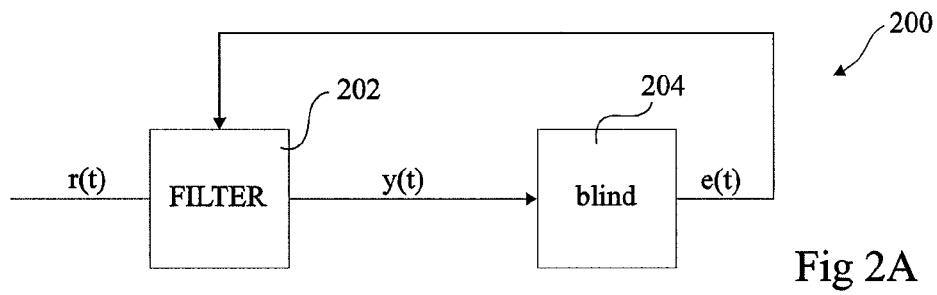
FIG. 2A illustrates a channel equalizer comprising blind error estimation circuitry.

FIG. 2A illustrates a channel equalizer 200 comprising a filter 202 which receives a signal r(t) and generates an equalized signal y(t). Blind error estimation circuitry 204 then generates an error signal e(t) based on the output of the filter 202. This error signal is provided back to the filter 202 to adapt the coefficients of the filter.

The error is estimated by the blind error estimation circuitry 204 based on a Reduced Constellation Algorithm (RCA), which computes the error at the output of the filter based on the assumption that the original constellation is smaller than the actual one. The actual constellation of the transmitted signal may comprise for example 8 or 15 amplitude levels, as in the case of 8-VSB (vestigial sideband) or 15-VSB transmission respectively. In either case the error signal can be generated based on the assumption that the constellation comprises only 2 levels.

Figure 2B:
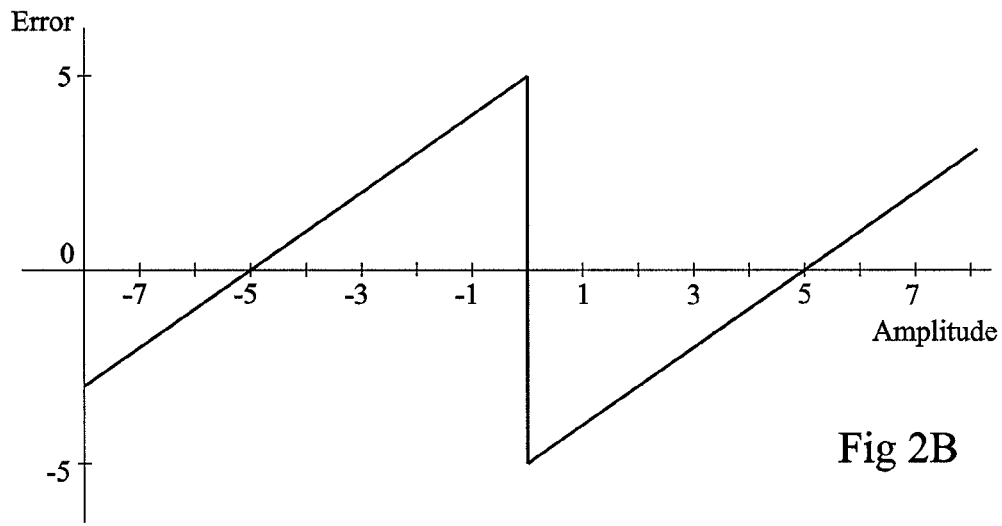
FIG. 2B illustrates estimated errors in an 8-VSB system when a reduced constellation is assumed.

FIG. 2B illustrates the error resulting from such an assumption that an 8-VSB signal, comprising the following 8 levels: −7, −5, −3, −1, 1, 3, 5, and 7, comprises two levels −5 and 5. As shown, the error signal is greatest at low magnitudes of the received signal. However, the equalizer output generally comprises many values in this range, and this results in a noisy error signal. As a consequence, it is difficult to quickly calibrate the coefficients of the filter using this method.

Figure 3:
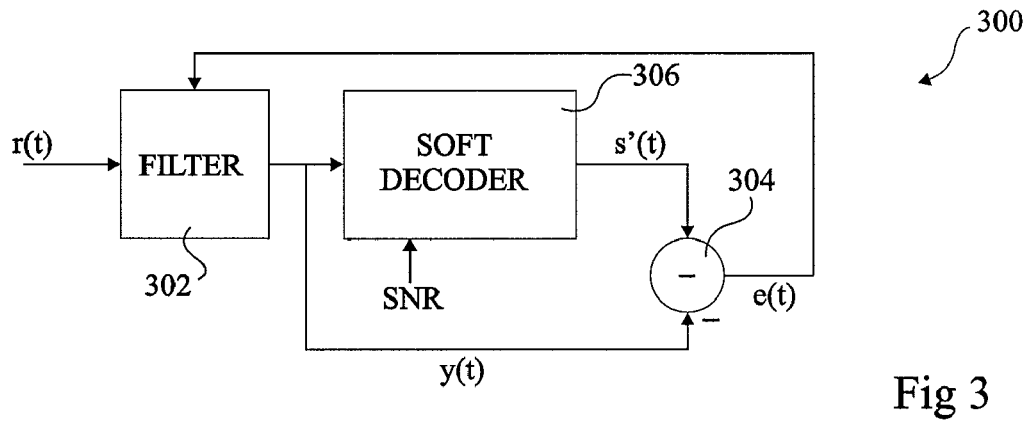
FIG. 3 illustrates a channel equalizer according to an embodiment of the present invention.

FIG. 3 illustrates a channel equalizer 300 comprising a filter 302, in this example a feed-forward filter. Filter 302 is for example similar to the filter 100 of FIG. 1, and comprises a number of taps, for example between five and a few thousand taps. Each tap is associated with a coefficient, which determines the weight to be applied to the output signal from that tap. The filter 302 receives a signal r(t), and outputs a filtered signal y(t) determined as the sum of the outputs from all of the taps. In particular, the filter for example outputs y(t) calculated as:

$$y(t) = \Sigma C_k * r(t-kT), \text{ for } k=0 \text{ to } N, \quad (1)$$

wherein $C_k$ is the coefficient of the kth tap, T is the time period between data values, such that r(t−kT) is the signal r(t) delayed by k data values, and there are a total of N+1 taps. The output y(t) is provided to a subtracter 304. Subtracter 304 subtracts a signal s'(t) from y(t) to generate an error signal e(t), which is fed back to the filter 302 and used to adapt the values of the coefficients of the taps. Signal s'(t) is generated by a soft decoder 306, which is coupled to the output of the filter 302, and generates s'(t) based on y(t) and the signal to noise ratio (SNR) of y(t), as will be described in more detail below. In particular, s'(t) is determined based on maximum likelihood, calculated as the sum of the probabilities that the data s(t) is equal to each possible level, given the output y(t), multiplied by the possible level. The error e(t) is then determined as the sum of the errors when y(t) is equal to each level, multiplied by the probability that s(t) is equal to that level, in other words:

$$e(t) = (y-a_1)*p(s=a_1|y) + \ldots + (y-a_N)*p(s=a_N|y) \quad (2)$$

where there are N levels, $a_1$ being a first level and $a_N$ being the final level, and $p(s=a_N|y)$ is the probability that s is equal to level $a_N$ given the output y. This probability is for example calculated based on the SNR, for example determined by circuitry provided in the equalizer.

The coefficients of equalizer 302 can then be adapted based on the error. They are for example updated according to the following formula:

$$Ck_n = Ck_{(n-1)} - \alpha r(t-kT)e(t) \quad (3)$$

where $C_k$ is the kth coefficient with k equal to 0 to N, $\alpha$ is a gain factor, r(t−kT) is the input r(t) delayed by kT, and e(t) is the error signal.

A more detailed example of a channel equalizer comprising error generating circuitry as described above will now be described with reference to FIG. 4.

Figure 4:
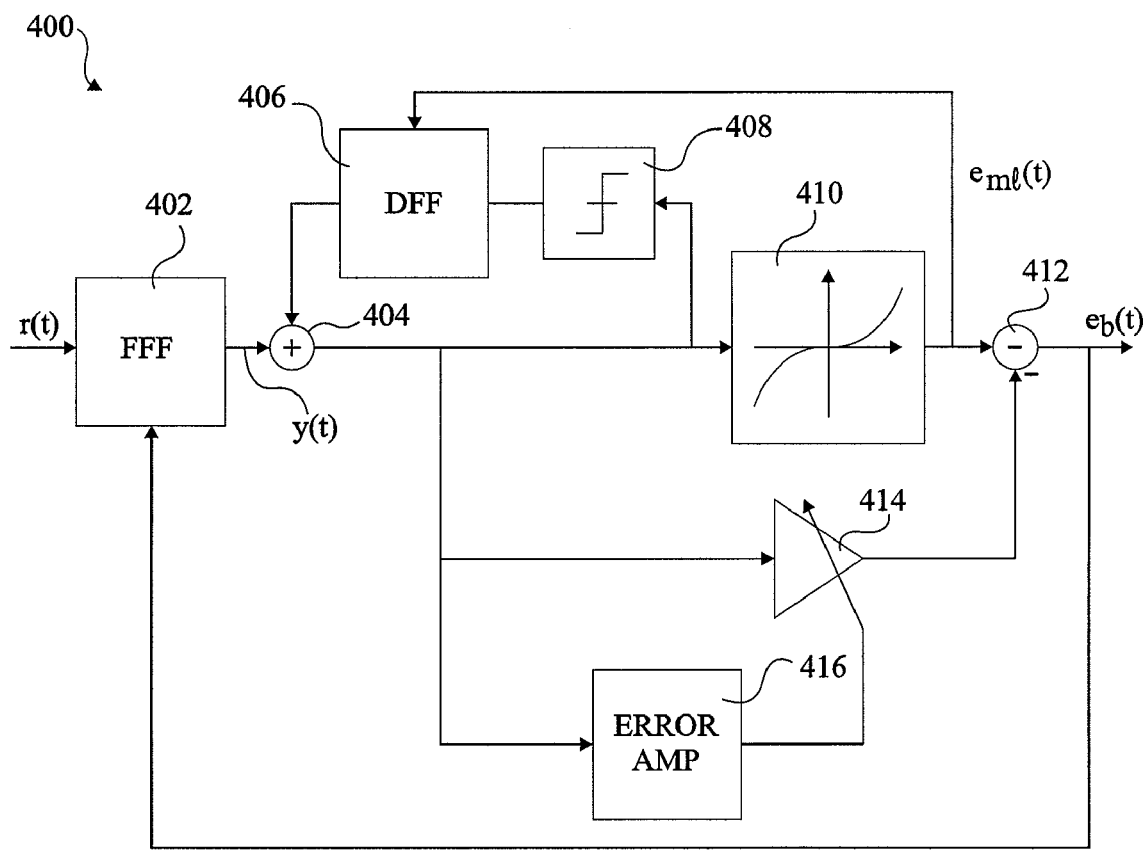
FIG. 4 illustrates a channel equalizer according to another embodiment of the present invention.

FIG. 4 illustrates a channel equalizer 400 comprising a feed-forward filter (FFF) 402, which is for example the same as the filter 100 of FIG. 1, and comprises a number of taps, for example between five and a few thousand taps. FFF 402 receives a signal r(t), for example received via an aerial, and provides an output signal y(t). The output of FFF 402 is coupled to an adder 404, which adds this to the output from a decision feedback filter (DFF) 406 to generate an output EQ_OUT. DFF 406 is similar to FFF 402 and comprises a number of taps, for example between five an a few thousand. However, the signal generated by DFF 406 is based on decoded data values rather than the signal r(t). The input of DFF 406 is coupled to the output of adder 404 via a symbol decoder 408. Symbol decoder 408 decodes the signal y(t) to determine the transmitted data symbols. The output of adder 404 is also coupled to the input of a maximum likelihood error estimation unit 410. Error estimation unit 410 outputs an error signal $e_{ml}(t)$ to a subtracter 412. The output of the error estimation unit 410 is also coupled directly to the DFF 406 to provide a control input for calibrating the coefficients of the taps in DFF 406. Subtracter 412 is also coupled to receive the output from a variable amplifier 414, and subtracts from this output the output of the error estimation unit 410. The input to variable amplifier 414 is coupled to the output of adder 404. Variable amplifier 414 is controlled by the output of an error amplifier 416, which also receives the output from adder 404.

Subtracter 412 outputs the blind error $e_b(t)$ calculated as the error $e_{ml}(t)$ minus the output from amplifier 414. This error value is coupled to FFF 402 as a control input for controlling the coefficients of each of the taps, which are, for example, updated according to formula (3) above.

The error estimation performed by unit 410 of the receive circuitry 400 is based on maximum likelihood. In particular, the error is calculated as the sum of the errors computed with respect to each of the levels of the constellation of the transmitted signal, weighted by the probability of each of these levels, computed with respect to the EQ output. The error estimation based on maximum likelihood will now be described in more detail assuming that the received signal was transmitted according to 8-VSB, although it will be apparent to those skilled in the art that this technique and the circuitry described herein could be applied to a broad range of amplitude modulated transmission with any number of levels, including but not limited to PAM (Pulse Amplitude Modulation) and QAM (quadrature amplitude modulation).

The 8-VSB constellation is assumed to comprise levels $-7$, $-5$, $-3$, $-1$, $1$, $3$, $5$ and $7$. The error is calculated as:

$$\text{error} = (y-7)^*p(s=7|y) + (y-5)^*p(s=5|y) + \ldots + (y+7)^*p(s=-7|y) \quad (1)$$

where y is the output value and $p(s=k|y)$ is the probability of the transmitted symbol s being equal to level k given the output value y.

Assuming that the noise is white and gaussian, the noise variance of the channel can be estimated by circuitry to give the standard deviation $\sigma$ of the noise as will be apparent to those skilled in the art, and the probability $p(s=k|y)$ that symbol s equals k when the equalizer output is y can be determined as:

$$P(s=k|y) = \exp(-(y-k)^2/(2\sigma^2))/(\exp(-(y-7)^2/(2\sigma^2)) + \exp(-(y-5)^2/(2\sigma^2)) + \ldots + \exp(-(y+7)^2/(2\sigma^2))) \quad (2)$$

It has been shown by the present applicant that for standard deviations of noise greater than 1, (SNR less than 14 dB), this error function is essentially monotonic, with no modulation around VSB levels, due to the fact that the translation has not yet been resolved.

Advantageously, resolving the error based on maximum likelihood as described above, the method results in a cleaner error signal when compared to an error signal in a reduced constellation algorithm.

Referring again to FIG. 4, the variable amplifier 414 and the error amplifier 416 for controlling the variable amplifier 414, in combination with subtractor 412, introduce the output of FFF 402 as a term in the calculation of the blind error $e_b(t)$. This is preferable, as in order to reduce the RMS error at the equalizer output, the natural tendency of the equalizer would be to decrease the signal amplitude to zero. To avoid this, part of the output signal is injected directly back into the error signal.

The error amplifier block 416 preferably calculates the gain applied to the output of the filter according to the following formula:

$$\text{gain} = \text{gain} - k(7^*(|EQ\_OUT|>7)-1) \quad (3)$$

where k is a constant, $|EQ\_OUT|$ is the absolute value of the filter output and $(|EQ\_OUT|>7)$ is a boolean equal to 1 when true, and 0 otherwise. Information in the signal y(t) is essentially carried by the highest absolute values, and in particular values greater than 7 or less than $-7$. To avoid over estimating or under estimating the number of values that occur outside these limits, the equalizer amplitude is preferably regulated such that the same proportion of values fall outside the range $-7$ to $7$ as would be expected in a regular equalized VSB signal, in other words one value out of eight. Thus the above formula adjusts the gain based to this criterion. While the range $-7$ to $7$ has been chosen as these are the highest and lowest voltage levels, in alternative embodiments this range could be adjusted to improve performance. Furthermore, it will be apparent to those skilled in the art that in alternative embodiments in which modulation different to 8-VSB is used, the highest and lowest voltage levels and/or the number of voltage levels may be different, and therefore the range $-7$ to $7$ and the proportion one value in eight can be adapted accordingly.

The variable gain design advantageously optimizes the amount of noise in the error signal when compared to the RCA algorithm, such that there is constant noise in the error signal. While the variable gain signal is added to the error signal to control the feed-forward filter 402 in the example of FIG. 4, in alternative embodiments it could be added to signal $e_{ml}(t)$ for control of the decision feedback filter 406. The arrangement of FIG. 4 is advantageous as the control signal to DFF 406 is noise free.

Figure 5:
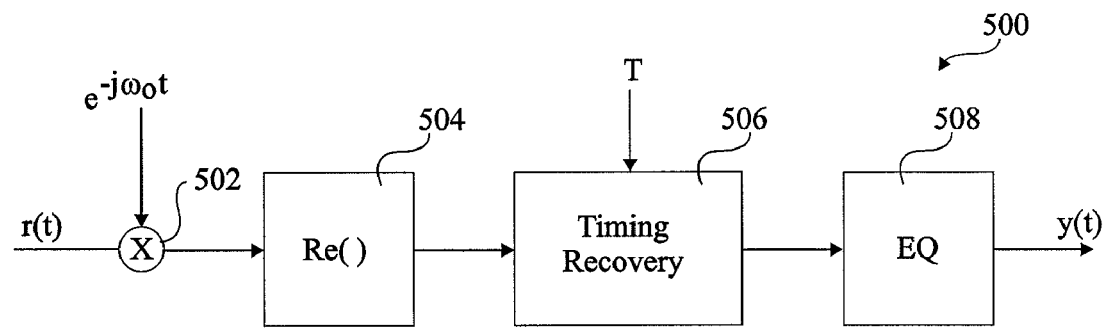
FIG. 5 illustrates receiving circuitry comprising a channel equalizer according to a further embodiment of the present invention.

FIG. 5 illustrates an overview of receiving circuitry 500 for generating a demodulated, equalized data signal y(t). As illustrated, a signal r(t) is received and demodulated by a multiplier 502, which multiplies the signal by a term $e^{-j\omega 0 t}$. The real part of the output of multiplier 502 is then extracted by block 504. The output of block 504 is coupled to timing recovery circuitry 506, which recovers timing of the signal using a time reference signal T. The output of the timing recovery circuit 506 is coupled to a channel equalizer, which comprises the circuitry of FIG. 4 described above, and which outputs the data signal y(t).

Preferably, the maximum likelihood error calculating technique described above is used for increasing the signal to noise ratio until a certain level is reached, for example 12 dB in the case of 8-VSB modulation. Above this SNR, a direct data mode (DDM) can be used in order to continue calibration of the filter coefficients. This mode is based on Viterbi decisions, and can be more accurate at higher signal to noise ratios than a maximum likelihood method, but as described above, is not useful when the SNR is lower than 12 dB. Thus the channel equalizer 508 of FIG. 5 preferably comprises both maximum likelihood error generating circuitry as described above, circuitry for determining when a certain SNR level has been reached, and DDM error generation circuitry for use when this level has been achieved. The same filter can for example be used in both the maximum likelihood mode and the DDM mode.

Figure 6:
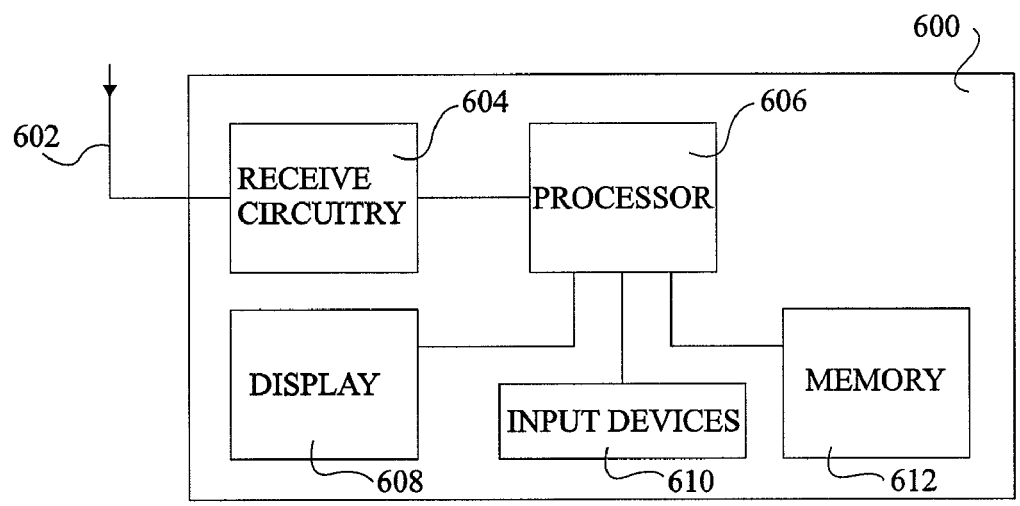
FIG. 6 illustrates a device according to a further embodiment of the present invention.

FIG. 6 illustrates a device 600 comprising a channel equalizer as described herein. Device 600 is for example a digital television decoder such a set top box coupled to a television. Alternatively, device 600 could be any circuitry that functions to decode a transmitted digital signal in a multi-path environment, such as a mobile telephone, personal computer, etc.

An aerial 602 is provided for receiving the broadcast signal. Device 600 further comprises receive circuitry 604, which for example comprises the receive circuitry 500 of FIG. 5. The receive circuitry is coupled to a processor 606 which is for example the main processor of the device. A display 608, input devices 610, for example a keypad or a mouse, and memory 612 are provided coupled to processor 606.

It will apparent to those skilled in the art that while certain examples of channel equalizers have been described, there are numerous alternatives, modifications and improvements that will be evident to those skilled in the art.

For example, as described above, embodiments of the channel equalizer described herein could be adapted to receive any transmission of a modulated signal in a multi-path environment. Such transmission could be based on any number of amplitude levels, and is not limited to the 8-level VSB coding described by way of example herein.

Furthermore, while channel equalizers comprising feed-forward filters have been described, these circuit arrangements could be adapted to use decision feedback filters, or a combination as shown in the example of FIG. 4.

While error amplification circuitry has been described in relation to FIG. 4 for injecting at least part of the output of the filter into the error signal, this circuitry may be implemented in different ways, for example providing a fixed gain to this injection signal.

Accordingly, the foregoing description is by way of example only and is not intended to be limiting. The invention is limited only as defined in the following claims and the equivalents thereto.

What is claimed is:

1. A channel equalizer arranged to receive a received signal from a data signal encoded by a plurality of amplitude levels, the channel equalizer comprising:

a filter comprising a plurality of taps, each tap generating an output signal based on a coefficient, an input for receiving an error signal for adapting said coefficients, and an output for outputting a filtered signal; and blind error generation circuitry arranged to generate said error signal, the blind error generation circuitry comprising:

error estimating circuitry arranged to estimate the error of said filtered signal based on maximum likelihood by determining a probability for each of the plurality of amplitude levels encoding the data signal, given the filtered signal; and adding circuitry coupled to said error estimating circuitry and to the output of said filter and arranged to add at least part of said filtered signal to the error estimated by said error estimating circuitry to generate said error signal;

wherein the error estimating circuitry is arranged to estimate the error of said filtered signal based on the following formula:

$$e(t)=(y-a1)*p(s=a1|y)+\ldots+(y-aN)*p(s=aN|y)$$

where there are N amplitude levels, a1 being a first level and aN being a final level, where y is the filtered signal, s is the data signal, and p(s=aN|y) is a probability that s is equal to level aN given the filtered signal y.

2. The channel equalizer of claim 1, wherein said channel equalizer is part of a vestigial sideband receiving system.

3. The channel equalizer of claim 1, wherein said adding circuitry is coupled to the output of said filter via a variable gain amplifier.

4. The channel equalizer of claim 3, wherein the variable gain amplifier is arranged to provide a gain such the portion of the filtered signal above a determined magnitude is maintained at a determined value.

5. The channel equalizer of claim 1, wherein said filter is a feed-forward filter, and further comprising a decision feedback filter coupled to the output of said feed-forward filter.

6. A device for receiving a transmitted signal comprising a processor and receive circuitry comprising the channel equalizer of claim 1.

7. A method of performing channel equalization comprising:

receiving a received signal from a data signal encoded by a plurality of amplitude levels;

filtering said received signal to provide a filtered signal using a plurality of taps, each tap generating an output signal based on a coefficient, said coefficients being updated based on an error signal; and blindly generating said error signal comprising:

estimating the error of said filtered signal based on maximum likelihood using error estimating circuitry by determining a probability for each of the plurality of amplitude levels encoding the data signal, given the filtered signal; and adding at least part of said filtered signal to the error estimated by said error estimating circuitry to generate said error signal;

wherein the error estimating circuitry is arranged to estimate the error of said filtered signal based on the following formula:

$$e(t)=(y-a1)*p(s=a1|y)+\ldots+(y-aN)*p(s=aN|y)$$

where there are N amplitude levels, a1 being a first level and aN being a final level, where y is the filtered signal, s is the data signal, and p(s=aN|y) is a probability that s is equal to level aN given the filtered signal y.

8. The method of claim 7, comprising adjusting said coefficients of said taps based on a direct data mode when a signal to noise ratio of said filtered signal reaches a determined level.

9. The method of claim 7, wherein said adding step comprises adding an amplified version of said filtered signal to said error estimated by said error estimating circuitry, the gain of said amplified version being determined by the following formula:

$$gain=gain-k((N-1)*(|EQ\_OUT|>V)-1)$$

where k is a constant, N is the total number of levels, |EQ_OUT| is the absolute value of the filtered signal (|EQ_OUT|>V) is a Boolean equal to 1 when |EQ_OUT| is greater than V and 0 otherwise, and V is a constant magnitude.

10. The method of claim 9, wherein V is equal to the magnitude of the highest level.

11. The channel equalizer of claim 1, wherein the error estimating circuit is further arranged to receive an indication of a signal-to-noise ratio of the filtered signal.

12. A channel equalizer comprising:

a filter comprising a plurality of taps, each tap of the plurality of taps generating an output signal based on a respective coefficient, the filter further comprising an input for receiving an error signal for adapting the respective coefficient of each tap of the plurality of taps, and the filter further comprising an output for outputting a filtered signal; and error generation circuitry configured to generate the error signal, the error generation circuitry comprising:

error estimating circuitry configured to estimate an error of the filtered signal based on maximum likelihood by determining a probability for each of a plurality of encoded amplitude levels encoding a data signal, given the filtered signal; and adding circuitry coupled to the error estimating circuitry and to the output of the filter and configured to add at least part of the filtered signal to the error of the filtered signal estimated by the error estimating circuitry to generate the error signal;

wherein the error estimating circuitry is arranged to estimate the error of said filtered signal based on the following formula:

$$e(t)=(y-a1)*p(s=a1|y)+\ldots+(y-aN)*p(s=aN|y)$$

where there are N amplitude levels, a1 being a first level and aN being a final level, where y is the filtered signal, s is the data signal, and p(s=aN|y) is a probability that s is equal to level aN given the filtered signal y.

13. The channel equalizer of claim 12, wherein the channel equalizer is part of a vestigial sideband receiving system.

14. The channel equalizer of claim 12, wherein the adding circuitry is coupled to the output of the filter via a variable gain amplifier.

15. The channel equalizer of claim 14, wherein the variable gain amplifier is configured to provide a gain such that a portion of the filtered signal above a determined magnitude is maintained at a determined value.

16. The channel equalizer of claim 12, wherein the filter is a feed-forward filter, and wherein the channel equalizer further comprises a decision feedback filter coupled to the output of the feed-forward filter.

17. A device for receiving a transmitted signal comprising a processor and receive circuitry comprising the channel equalizer of claim 12.

18. A method of performing channel equalization comprising:
receiving a received signal from a data signal encoded by a plurality of amplitude levels;
filtering the received signal to produce a filtered signal using a plurality of taps, each tap of the plurality of taps generating an output signal based on a respective coefficient;
updating the respective coefficient of each tap of the plurality of taps based on an error signal; and
generating the error signal by:
estimating an error of the filtered signal based on maximum likelihood by determining a probability for each of the plurality of encoded amplitude levels encoding the data signal, given the filtered signal; and
adding at least part of the filtered signal to the error of the filtered signal estimated during the estimating step to generate the error signal;
wherein the error estimating circuitry is arranged to estimate the error of said filtered signal based on the following formula:

$$e(t)=(y-a1)*p(s=a1|y)+\ldots+(y-aN)*p(s=aN|y)$$

where there are N amplitude levels, a1 being a first level and aN being a final level, where y is the filtered signal, s is the data signal, and p(s=aN|y) is a probability that s is equal to level aN given the filtered signal y.

19. The method of claim 18, further comprising adjusting the respective coefficient of each tap based on a direct data mode when a signal to noise ratio of the filtered signal reaches a determined level.

20. The method of claim 18, wherein the adding step comprises adding an amplified version of the filtered signal to the error of the filtered signal estimated during the estimating step, a gain of the amplified version being determined by the following formula:

$$\text{gain}=\text{gain}-k((N-1)*(|EQ\_OUT|>V)-1)$$

where k is a constant, N is the total number of levels of the plurality of levels, |EQ_OUT| is an absolute value of the filtered signal, (|EQ_OUT|>V) is a Boolean equal to 1 when |EQ_OUT| is greater than V and 0 otherwise, and V is a constant magnitude.

21. The method of claim 20, wherein V is equal to a magnitude of the highest level of the plurality of levels.

* * * * *